United States Patent [19]
Carter

[11] 4,024,347
[45] May 17, 1977

[54] TELEPHONE CALCULATOR
[75] Inventor: Everett M. Carter, Winona, Minn.
[73] Assignee: Lake Center Industries, Winona, Minn.
[22] Filed: Aug. 11, 1975
[21] Appl. No.: 603,437
[52] U.S. Cl. .............................. 179/2 DP; 179/90 K
[51] Int. Cl.² ........................................ H04M 1/50
[58] Field of Search ....................... 179/2 DP, 90 K
[56] References Cited
UNITED STATES PATENTS

| 3,760,121 | 9/1973 | Nissim | 179/90 K |
| 3,932,709 | 1/1976 | Hoff et al. | 179/90 K |

*Primary Examiner*—George G. Stellar
*Attorney, Agent, or Firm*—Kinzer, Plyer, Dorn & McEachran

[57] ABSTRACT

The combination of a calculator and a telephone set and telephone tone generating means is arranged so that the calculator drives the telephone tone generators. When the telephone is activated, for example by lifting the handset, the calculator is connected to the tone generators with operation of the calculator switches driving the tone generators. A switch is provided whereby the calculator may subsequently be operated, as a calculator, while the telephone set is being used, without operating the tone generators.

12 Claims, 2 Drawing Figures

TELEPHONE CALCULATOR

SUMMARY OF THE INVENTION

The present invention relates to the combination of a calculator and a telephone set which is so connected that the calculator drives the telephone tone generators.

One purpose of the invention is a combination of the type described in which the start of the telephone operation, for example lifting the handset, connects the calculator to the telephone tone generators such that the operation of the calculator switches is effective to "dial" a telephone number.

Another purpose is a combination of the type described in which the calculator can be operated by itself, or as a means to operate telephone tone generators.

Another purpose is a combination of the type described utilizing an OR gate matrix to connect the calculator to a series of flip flop latches which in turn drive telephone tone generators.

Another purpose is a simply constructed reliably operable circuit of the type described.

Other purpose will appear in the ensuing specification, drawing and claims.

BRIEF DESCRIPTION OF THE DRAWINGS

The invention is illustrated diagrammatically in the following drawings wherein.

DESCRIPTION OF THE PREFERRED EMBODIMENT

The present invention relates to the combination of a calculator and a telephone in which the calculator switches may be used to place a telephone call in the normal manner and in which the calculator may be used as an entity, either during a telephone conversation, or at any other time. The calculator switches and the calculator drive curcuits provide the necessary logic for the telephone tone generators.

Figure 1:
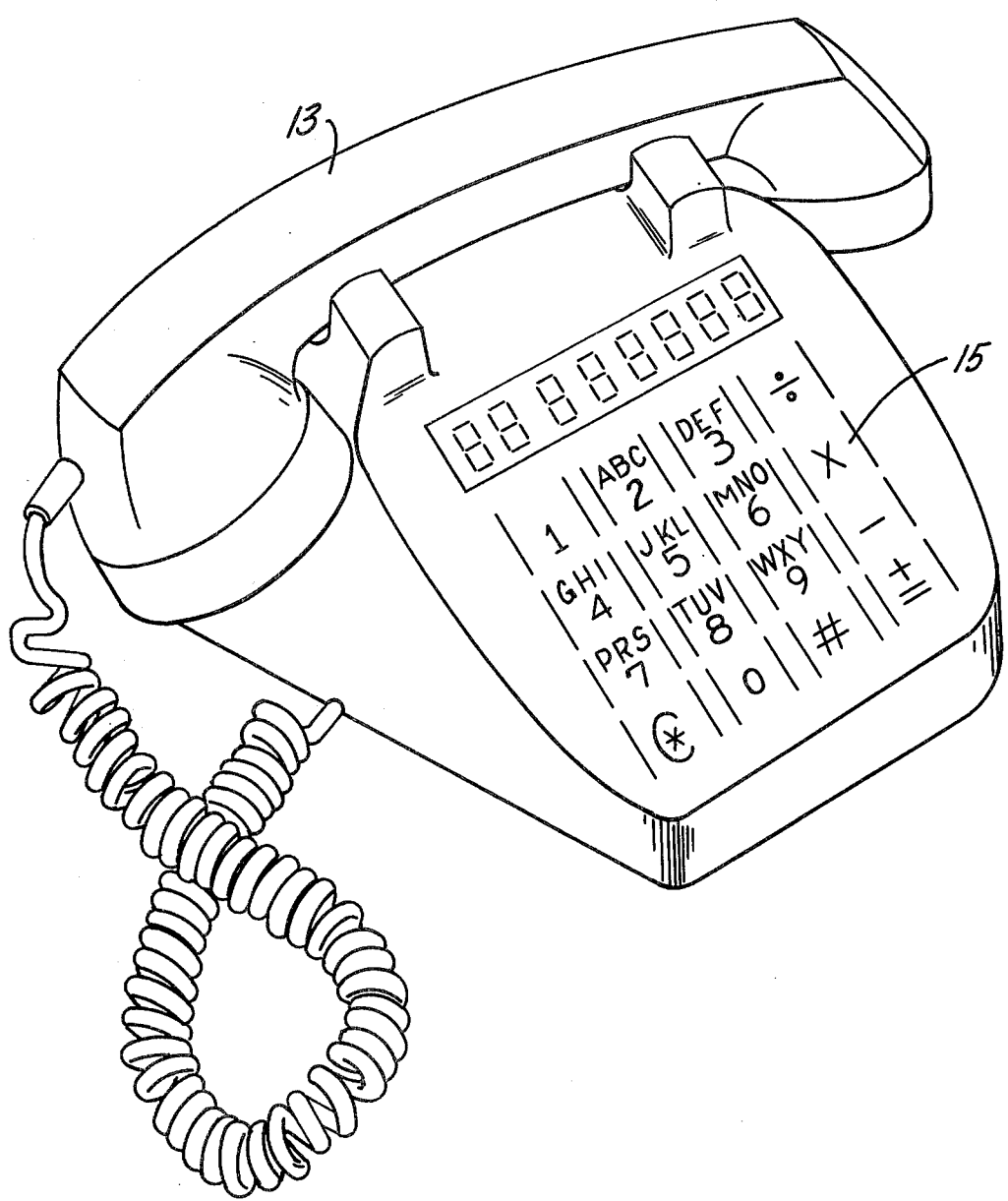
FIG. 1 is a diagrammatic illustration of a telephone and calculator keyboard.

In FIG. 1, a typical telephone is indicated at 11 and has a handset 13 and a calculator keyboard 15.

Figure 2:
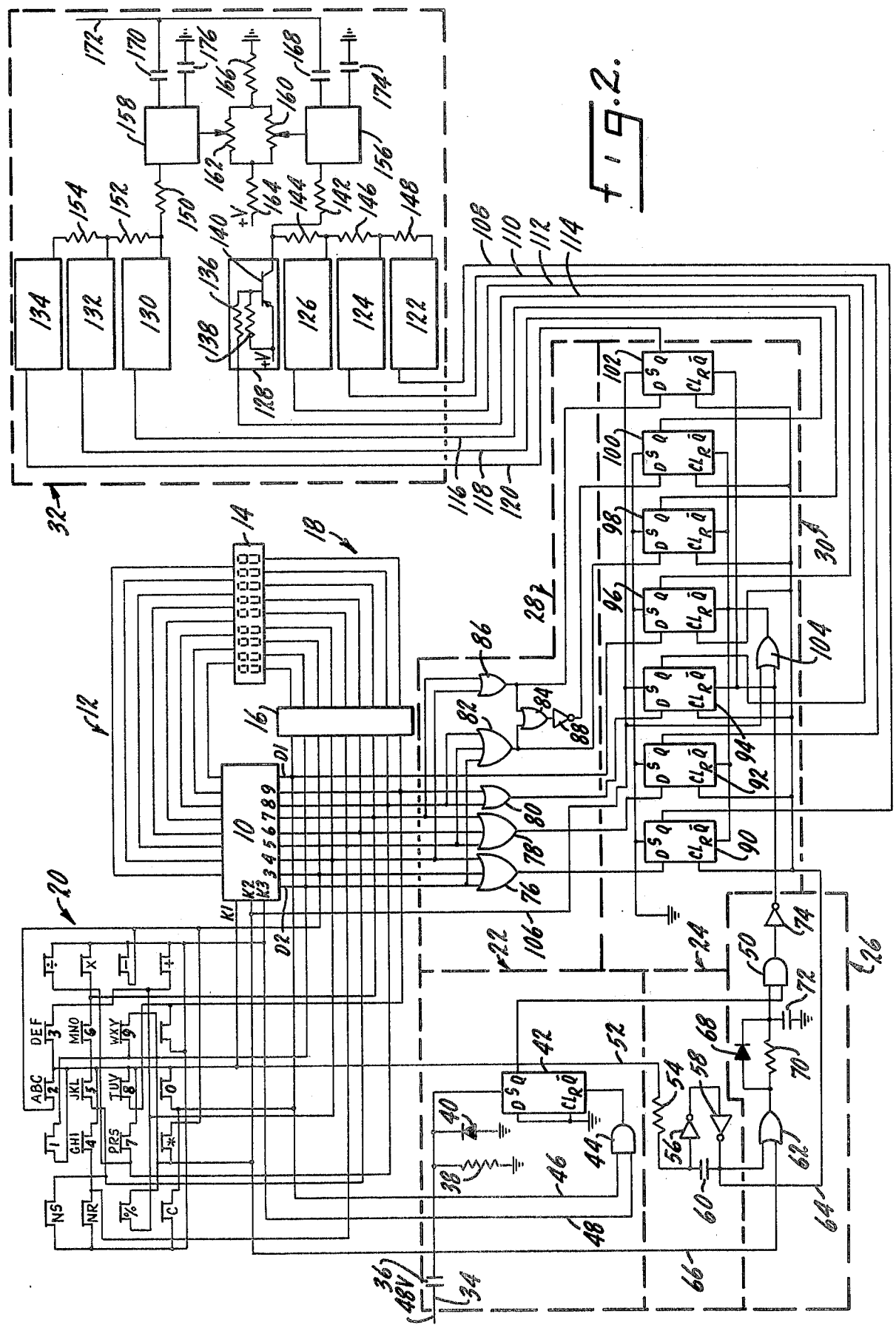
FIG. 2 is a schematic diagram of the invention.

The calculator circuitry portion of FIG. 2 is conventional and may include a calculator or computer 10 which may typically be an MM5738N which is connected by lines 12 to an indicating device 14. The indicator drive circuitry, which may be a DM8864, is indicated at 16 and is connected by lines 18 to the indicator 14. The calculator switches are indicated generally at 20 with each of the switches having the appropriate designation for its particular function in a calculating operation.

The calculator 10 has strobe lines D1 through D9, which are connected in the conventional manner to switches 20 and has input lines K1 through K3 which are also connected to switches 20 in the conventional manner.

A telephone control is indicated within broken line enclosure 22, a pulse detector circuit is indicated within broken line enclosure 24 and a blank detector circuit is indicated within broken line enclosure 26. A decode matrix is indicated within broken line enclosure 28, a data latch is indicated within broken line enclosure 30 and the telephone tone generators are indicated within broken line enclosure 32. The various blocks just described are interconnected and will be described hereinafter.

Telephone control 22 has an input of a 48 volt signal on line 34 which voltage is supplied from the conventional telephone equipment. A capacitor 36 is connected in line 34 with the input voltage being connected through a differentiator made up of a resistor 38 and a diode 40 to a flip flop 42. The reset input of flip flop 42 is connected to AND gate 44. Gate 44 is connected through line 46 to the D1 calculator strobe line and through line 48 to K3 calculator input.

The Q output of flip flop 42, which is the output from the telephone control, is connected to one input of AND gate 50 in blank detector 26. The input for pulse detector 24 is provided on line 52 which is connected to calculator input K1. Line 52 is connected to a delay network comprising resistor 54 and a pair of inverting amplifiers 56 and 58 having a capacitor 60 connected therebetween. The output from pulse detector 24, provides one input for OR gate 62, with a second output from pulse detector 24 being provided on line 64 which is connected to data latch 30. A second input for OR gate 62 is provided on line 66 which is connected to the calculator input k2.

OR gate 62 is connected to a delay circuit comprising a diode 68 connected in parallel with a resistor 70, with one common side of these elements being connected to a capacitor 72. The output from the common junction of these elements is connected to AND gate 50. The output from AND gate 50 is connected through an inverting amplifier 74 to data latch 30.

The OR matrix decode circuit 28 includes a series of OR gates indicated at 76, 78, 80, 82, 84 and 86. OR gates 76, 78, and 82 are each connected to three of strobe lines D1 through D9, with OR gates 80 and 86 being connected to two such strobe lines. The outputs of OR gates 82 and 86 are connected to the input of OR gate 84, with the output of OR gate 84 being connected through an inverting amplifier 88 to data latch 30. OR gates 76, 78, 80, 82 and 86 in turn each have outputs connected to data latch 30.

Data latch 30 includes a series of seven flip flops designated at 90, 92, 94, 96, 98, 100 and 102. An OR gate 104 receives one input from inverting amplifier 74 of blank detector 26 and a second input from line 106 which is connected to calculator input K2. OR gate 104 has a reset output which is connected in common to flip flops 90, 92, 96, 98 and 100. The reset inputs for flip flops 94 and 102 is provided by inverting amplifier 74 or the input side of OR gate 104. The clock input for all flip flops in data latch 30 is provided on line 64 which is connected to pulse detector 24. The inputs for the data latch flip flops are as follows: flip flop 90 is connected to OR gate 76; flip flop 92 is connected to OR gate 78; flip flop 94 is connected to OR gate 80; flip flop 96 is connected directly to line calculator strobe line D1; flip flop 98 is connected to OR gate 82; flip flop 100 is connected to inverting amplifier 88; and flip flop 102 is connected to OR gate 86.

The Q outputs of flip flops 90-102 are connected through lines 108, 110, 112, 114, 116, 118 and 120 and to voltage control switches 122-134, respectively. Said switches are identical with the details illustrated in switch 128 as including a resistor 136 connected to the switch input and a second resistor 138 connected to a reference voltage. A transistor 140 has its emitter connected to the reference voltage and its collector connected to the common junction of resistors 138 and 136. The output of transistor 140 is connected to the junction point of resistors 142 and 144. The output from voltage control switch 126 is connected to the junction of resistors 144 and 146 with the output of voltage control switch 124 being connected to the junction of resistors 146 and 148. Similarly, resistors 150, 152 and 154 are connected to the outputs of voltage control switches 130, 132 and 143. The bottom side of resistors 142 and 144 are each connected to voltage controlled oscillator tone generators 156 and 158 which may typically be Signetics NE556.

Variable resistors 160 and 162 are commonly connected through resistor 164 to a reference voltage with the taps on resistors 160 and 162 being connected to tone generators 156 and 158 for precise control of the oscillator frequencies. A resistor 166 is connected from the common point of resistors 160 and 162 to ground. The outputs from tone generators 156 and 158 are connected respectively through capacitors 168 and 170 to output line 172 which will be connected to the conventional telephone line for sending dialing information. The circuit may be completed by capacitors 174 and 176 which are respectively connected between ground and tone generators 156 and 158.

In operation when the calculator is to be used, either during the telephone call or at any other time, the calculator switches are operated in the normal manner and the calculator will function in the normal manner to display the inputs and outputs therefrom on indicator 14.

When it is desired to make a telephone call, lifting of handset 13, or in some other way turning on the telephone set, connects line 34 to a 48 volt signal which in turn provides an input at flip flop 42. The output from the Q terminal of flip flop 42 provides one input for AND gate 50 in the blank detector. If one of the switches customarily used in making a telephone call, for example the number 8, is closed, a signal will be provided over line 52, with an appropriate delay through resistor 54 and capacitor 60, to one input of OR gate 62 and to line 64. Since line 64 provides the clock signal for flip flops 90 through 102, these latching circuits will all be placed in a condition to receive an input from OR gate matrix 28. Simultaneously, the signal from OR gate 62 will cause capacitor 72 to charge such that blank detector AND gate 50 will now have high levels at both inputs with the result that it will go high. A high output from AND gate 50 will result in a low output from inverter amplifier 74 which will clear the reset signal from all latching flip flops. Thus, all flip flops will be in a condition to receive a signal from one of OR gates 76-86.

As calculator 10 will be continuously and repetitively strobing lines D1-D9, at such time as line D9 is strobed, a signal will be provided at OR gate 80 which will then provide an input at the D terminal of flip flop 94. Thus, there will then be an output from the Q terminal of flip flop 94, over line 112, to voltage control switch 126. The output from voltage control switch 126 provides a voltage at the junction of resistors 146 and 144 which in turn then provides a particular voltage at the input of tone generator 156 to control the oscillator frequency.

OR gate 84 is connected to the outputs of OR gates 82 and 86 with the result that if either OR gate 82 or OR gate 86 goes high, OR gate 84 will go high, which in turn will cause the output of inverter amplifier 88 to be low, which low does not provide a signal for operation of flip flop 100. However, if neither OR gates 82 and 86 go high, signifying an input, then OR gate 84 will go low, causing a high from inverter amplifier 88 which in turn will provide an operational signal to flip flop 100 which will in turn provide an output on line 118 to voltage control switch 132 which will cause operation of tone generator 158.

As long as switch 8 is closed, tone generators 156 and 158 will provide the signals as described. At such time as switch 8 is released, AND gate 50 will go low, causing inverter amplifier 74 to go high, which will then provide a reset signal for all of the latching flip flops placing them in a condition to receive the next digit.

Each of the switch closures used in telephone operation will provide operation of both tone control oscillators. For example, when D2 is strobed, and there is closure of switch 1, OR gates 76 and 82 will go high providing appropriate signals for flip flops 90 and 98. The closure of switch 2 will similarly cause operation of flip flops 90 and 100. A closure of switch 3 will cause operation of flip flops 90 and 102. A closure of switch 4 will cause operation of flip flops 92 and 98. A closure of switch 5 will cause operation of flip flops 92 and 100. A closure of switch 6 will cause operation of flip flops 92 and 102. A closure of switch 7 will cause operation of flip flops 94 and 98. A closure of switch 9 will cause operation of flip flops 94 and 102 and a closure of switch 0 will cause operation of flip flops 96 and 100.

After the total number of digits in a particular telephone number have been dialed, the operator presses the clear button, which then will cause AND gate 44 to go high, providing a reset signal for flip flop 42, removing one input for AND gate 50, thus preventing any further operation of the latching flip flops. Thereafter, operation of the calculator, even while the telephone receiver is in use, takes place without operation of the tone generators.

The above-described operation is effective for digits 0-8. When digit is pushed during a telephone dialing operation, OR gate 62 of blank detector 26 receives an input directly from the calculator K2 input over line 66 to operate the blank detector and remove the reset signal.

What is important to note is that the calculator portion of the overall combination operates in the normal manner whenever the telephone is not being used and during operation of the telephone, after completion of a dialing operation. The conclusion of a dialing operation, signified by depressing the clear button of the calculator, disables the data latch so that subsequent operation of the calculator keyboard switches will not cause operation of the tone generators. The calculator circuitry is used to drive the telephone tone generators during a dialing operation through the described circuitry. The act of removing the telephone handset or operating a speaker-type phone, will provide an initial 48-volt operating signal to the telephone control which will then in turn place the blank detector in a condition to be subsequently operated as described.

Whereas the preferred form of the invention has been shown and described herein, it should be realized that there may be many modifications, substitutions and alterations thereto.

The embodiments of the invention in which an exclusive property or privilege is claimed are defined as follows:

1. In combination, calculating means, series of switches connected to said calculating means for causing operation thereof, indicating means connected to said calculating means for showing the inputs thereto,
a telephone, telephone tone generating means, and control circuit means having input connections to said switches and said calculating means and an output connection to said telephone tone generating means and telephone including a decode matrix connected to said calculating means and a data latch connected between said decode matrix and said tone generating means, means connected to said data latch and switches for providing reset and clock signals therefor, and a reset gate connected to said data latch and means connected to said telephone for providing an input thereto, whereby operation of said switches will cause operation of said telephone generating means through said control circuit means.

2. The combination of claim 1 further characterized in that said data latch includes a series of flip flop circuits, said telephone tone generating means including a pair of voltage controlled oscillators, with each flip flop being connected to one oscillator.

3. The combination of claim 2 further characterized in that said decode matrix includes a series of OR gates, with the outputs of said gates being connected to said flip flops.

4. The combination of claim 1 further characterized in that said tone generating means includes a pair of voltage controlled oscillators and a series of voltage control switches, with each switch being connected to one oscillator.

5. The combination of claim 4 further charaterized in that said data latch includes a series of flip flops, there being an equal number of flip flops and voltage control switches, with each flip flop being connected to one switch.

6. The combination of claim 5 further characterized in that each voltage control switch includes a three element transistor having one element connected to a reference voltage, a second element connected through resistor means to a flip flop and the third element connected to one of said oscillators.

7. The combination of claim 5 further characterized by and including a resistive network connected between each oscillator and a portion of said switches.

8. The combination of claim 1 further characteirzed in that the means connected to said telephone for providing an input for said reset gate includes a flip flop connected to said telephone.

9. The combination of claim 8 further characterized by and including a clear gate connected to said flip flop for providing a reset signal therefor, the input to said clear gate being connected to said switches.

10. The combination of claim 1 further characterized in that said control circuit means includes a pulse detector connected to said switches and to said reset gate.

11. The combination of claim 10 further characterized in that said pulse detector is connected to said data latch for providing the clock signals therefor.

12. The combination of claim 11 further characterized in that said pulse detector includes a delay circuit.

* * * * *